(12) United States Patent
Torres Martinez

(10) Patent No.: US 11,267,165 B2
(45) Date of Patent: Mar. 8, 2022

(54) METHOD FOR TREATING FIBRES, INSTALLATION FOR TREATING FIBRES AND THUS OBTAINED TAPE MADE OF TREATED FIBRES

(71) Applicant: Manuel Torres Martinez, Pamplona (ES)

(72) Inventor: Manuel Torres Martinez, Pamplona (ES)

( * ) Notice: Subject to any disclaimer, the term of this patent is extended or adjusted under 35 U.S.C. 154(b) by 96 days.

(21) Appl. No.: 16/317,661

(22) PCT Filed: Jul. 10, 2017

(86) PCT No.: PCT/ES2017/070497
§ 371 (c)(1),
(2) Date: Jan. 14, 2019

(87) PCT Pub. No.: WO2018/015594
PCT Pub. Date: Jan. 25, 2018

(65) Prior Publication Data
US 2019/0232529 A1   Aug. 1, 2019

(30) Foreign Application Priority Data
Jul. 20, 2016 (ES) ................ ES201630984

(51) Int. Cl.
*B05D 1/00* (2006.01)
*B29B 15/12* (2006.01)
(Continued)

(52) U.S. Cl.
CPC .............. *B29B 15/12* (2013.01); *B05D 1/007* (2013.01); *B29B 11/16* (2013.01); *B29C 70/00* (2013.01);
(Continued)

(58) Field of Classification Search
CPC ......... B29B 15/12; B29B 11/16; B05D 1/007; B29C 70/00; B29C 70/38; D06M 10/10;
(Continued)

(56) References Cited

U.S. PATENT DOCUMENTS 3,943,805 A * 3/1976 Lubitzsch ................ D01G 1/10
83/23
5,296,064 A * 3/1994 Muzzy .................... B29C 70/20
156/166
(Continued)

FOREIGN PATENT DOCUMENTS

GB          1259084 A     1/1972
GB          2445929 A     7/2008
(Continued)

OTHER PUBLICATIONS

International Search Report dated Jan. 3, 2018 for PCT/ES2017/070497 and English translation.

*Primary Examiner* — Alexander M Weddle
(74) *Attorney, Agent, or Firm* — Lucas & Mercanti, LLP

(57) ABSTRACT

The invention relates to a method for treating fibres, to an installation for treating fibres and thus obtained tape made of treated fibres. The treatment method comprises the steps of continuously supplying a bundle of fibres (1), applying a first resin (51) to the bundle of fibres (1) by electrostatic deposition of particles of the first resin (51), bonding the particles of the first resin (51) to the bundle of fibres (1) by heating, and applying a surface coating to at least one side of the bundle of fibres (1) by depositing filaments of a second resin (91), such that the thus obtained tape made of fibres has a minimum resin load in relation to the fibre used.

14 Claims, 3 Drawing Sheets

(51) Int. Cl.
*B29C 70/00* (2006.01)
*B60N 2/28* (2006.01)
*B29B 11/16* (2006.01)
*D06M 10/10* (2006.01)
*B29C 70/38* (2006.01)

(52) U.S. Cl.
CPC ........... *B60N 2/286* (2013.01); *B60N 2/2806* (2013.01); *B60N 2/2821* (2013.01); *B60N 2/2851* (2013.01); *B60N 2/2872* (2013.01); *B60N 2/2875* (2013.01); *B60N 2/2884* (2013.01); *B60N 2/2887* (2013.01); *D06M 10/10* (2013.01); *B29C 70/38* (2013.01); *B60N 2/2881* (2013.01)

(58) Field of Classification Search
CPC .. B60N 2/2806; B60N 2/2821; B60N 2/2875; B60N 2/2884; B60N 2/2851; B60N 2/286; B60N 2/2872; B60N 2/2887; B60N 2/2881
See application file for complete search history.

(56) References Cited

U.S. PATENT DOCUMENTS

| | | | | |
|---|---|---|---|---|
| 5,756,206 | A | * | 5/1998 | Davies ................. D06M 23/08 428/367 |
| 2009/0301641 | A1 | * | 12/2009 | Asahara ............... B29C 70/545 156/148 |
| 2011/0171034 | A1 | | 7/2011 | Whiter |
| 2014/0162063 | A1 | * | 6/2014 | Dzenis .................... D01F 6/18 428/401 |
| 2015/0375461 | A1 | | 12/2015 | Blackburn et al. |

FOREIGN PATENT DOCUMENTS

| | | | | |
|---|---|---|---|---|
| JP | S61-220808 | A | | 10/1986 |
| JP | H04-138219 | A | | 5/1992 |
| JP | H09241403 | A | | 9/1997 |
| JP | 2007099926 | A | | 4/2007 |
| JP | 2010260888 | A | | 11/2010 |
| JP | 2012107160 | A | * | 6/2012 ............... C08J 5/04 |
| JP | 2012107160 | A | | 6/2012 |

\* cited by examiner

METHOD FOR TREATING FIBRES, INSTALLATION FOR TREATING FIBRES AND THUS OBTAINED TAPE MADE OF TREATED FIBRES

CROSS REFERENCE TO RELATED APPLICATION

This Application is a 371 of PCT/ES2017/070497 filed on Jul. 10, 2017 which, in turn, claimed the priority of Spanish Patent Application No. 201630984 filed on Jul. 20, 2016, both applications are incorporated herein by reference.

SECTOR OF THE ART

The present invention relates to treating fibres for obtaining tapes to be used in tape laying processes, proposing a method and installation for treating fibres in which the thus obtained tape made of treated fibres has a minimum resin load in relation to the fibre used, due to the application of a first resin by controlled electrostatic deposition and the application of a partial and permeable surface coating of a second resin by a swirling or flocking process.

STATE OF THE ART

Tapes made of treated fibres are obtained from a reinforcement material generally in the form of a bundle of fibres ("tow"), such as carbon fibres or glass fibres, and a binder, such as a resin. The current pace of demand in the industry has meant that the manual manufacture of parts from composite materials has been replaced with automatic tape laying processes, such as, for example, ATL ("Automated Tape Laying") or AFP ("Automated Fiber Placement"), in which the bundle of fibres must be treated in order to give the fibres sufficient consistency so they do not sustain damage or deviations in their orientation during the tape laying process.

Today, tapes made of fibres are obtained from dry fibres, preimpregnated fibres (prepegs) or semi-preimpregnated fibres.

The dry fibres do not introduce the main resin load in the method of treatment thereof, but rather the main resin load is applied during the actual process of manufacturing the part, such as, for example, infusion processes or resin transfer moulding (RTM) processes. There are different methods for the preparation of dry fibre preforms, such as weaving, three-dimensional fabric or sewing, with sewing currently providing more compact and suitable results for use in the automatic tape laying processes.

One document describing a method for treating dry fibre is patent document US20150375461, which describes a material of dry fibre to be used in automatic tape laying processes which contains as a base a layer of unidirectional fibres, to which a thermoplastic veil is added attached to at least one of its sides, achieved by means of short fibres, a thermoplastic grid or a porous thermoplastic membrane, in addition to one or two binders, applied in solution, which ensure cohesion.

The preimpregnated fibres can be both unidirectional fibres and fabrics, which are preimpregnated with the amount of resin required to produce a part, usually a thermosetting resin, although it can also be a thermoplastic resin. Generally, when the resin is a thermosetting resin, it is partially cured to facilitate handling the preimpregnated fibre, as the mixture must be conserved in a cool environment to prevent its complete crosslinking. The preimpregnated fibres are obtained by means of a hot melt process or a solvent immersion process. Hot melting consists of coating the reinforcement material with a hot, thin resin film, to then apply pressure and heat to carry out impregnation of the reinforcement material with the resin. The immersion process consists of dissolving the resin in a solvent bath and submerging the reinforcement material in it, subsequently evaporating the solvent from same.

Some documents describing processes for treating preimpregnated fibres are, for example, patent document JP2010260888, which describes a method of manufacturing a preimpregnated material which prevents the accumulation of air and irregular impregnation, which comprises applying heat and pressure to the material to transfer the resin. Patent document JPH09241403 describes a system for deposing an adherent powder on the surface of a preimpregnated material for the purpose of improving its tackiness. Patent document JPS61220808 describes a system for depositing resin on a tape made of carbon fibres by electrostatic means, together with a subsequent heating step above the melting temperature of the resin, to form a completely preimpregnated material. Patent document JP2007099926 describes a method for producing a preimpregnated material, using a conductive sheet on one side of the tape made of fibres and a charged powdery resin on the opposite side of said bundle, the resin being deposited between the filaments of the fibre by electrostatic force, to later heat and melt that resin and form, again, a preimpregnated material.

Tapes made of semi-preimpregnated fibres are obtained by applying a resin film on the fibres, but without completely wetting them with the resin until they are subjected to high temperatures and pressures during the process of manufacturing the part.

Some documents describing processes for treating semi-preimpregnated fibres are, for example, patent document US20110171034, which describes a semi-preimpregnated material comprising a first thermosetting resin layer, coated on both sides with layers of fibrous reinforcements, one of the layers being coated with a second layer of resin with a specific tack level. Patent document JP2012107160 describes a composite material based on a woven fibre having a matrix made up in part of thermosetting resin and in part of thermoplastic resin, the latter being adhered by electrostatic spinning, and formed by a non-woven fabric composed of nanofibres.

None of these solutions has as an object, it should be noted, treating a bundle of fibres in a continuous format for generating a tape made of bonded and treated dry fibres, which can be used in automatic tape laying processes, and maintaining the capacity of the thus obtained tape made of treated fibres to be introduced in infusion- or RTM-based manufacturing processes.

OBJECT OF THE INVENTION

The object of the present invention is a method for treating fibres, an installation for carrying out the treatment method, and a thus obtained tape made of fibres treated by means of the treatment method.

The method for treating fibres of the invention comprises at least the following steps:
continuously supplying a bundle of fibres, preferably at a rate between 1 m/min and 100 m/min,
applying a first resin to the bundle of fibres by electrostatic deposition of particles of the first resin, in which preferably the amount of the first resin applied is less than 10% of the weight of the bundle of fibres, and in which the particles of the first resin preferably have a size between 1 micron and 300 microns, which can be applied on one or on both sides of the bundle bonding the particles of the first resin to the bundle of fibres by heating, which allows completely or partially melting the particles, applying a partial and permeable surface coating to at least one side of the bundle of fibres by depositing filaments of a second resin, the thickness of the surface coating preferably being less than 0.2 mm.

Preferably, the first resin is applied directly to the bundle of fibres and the surface coating of the second resin is applied to the bundle of fibres with the first resin; however, without this altering the concept of the invention, the surface coating of the second resin can be applied directly to the bundle of fibres and the first resin can be applied to the bundle of fibres with the surface coating of the second resin.

The method additionally comprises a step prior to the application of the first and second resin in which the width of the bundle of fibres is adjusted, the adjustment of the width of the bundle of fibres comprising a first sub-step in which the bundle of fibres is passed through first rollers with a concave surface which reduce the width of the bundle of fibres, and a second sub-step in which the bundle of fibres is passed through second rollers with a cylindrical surface which are opposite and separated from one another so as to increase the width of the bundle of fibres to a desired value by means of controlled friction of the bundle of fibres on the second rollers (and additionally on the first rollers).

The method of the invention additionally also comprises a step in which heat and pressure are applied to the particles of the first resin so that they can be diffused in the bundle of fibres.

According to an exemplary embodiment of the invention, the surface coating is obtained by depositing molten filaments of the second resin in the form of spiral on at least one side of the bundle of fibres and subsequently applying an air stream on the coated bundle of fibres for the cooling thereof.

According to another exemplary embodiment of the invention, the surface coating is obtained by depositing filaments of the second resin by electrostatic deposition on at least one side of the bundle of fibres, and subsequently applying heat to the filaments to melt the second resin, which melt or are diffused in the bundle of fibres, and applying an air stream to the coated bundle of fibres for the cooling thereof.

The application of the surface coating, in any of its versions, serves the purpose of providing cohesion to the tape made of fibres and improving its permeability in the direction parallel to the plane, commonly defined by means of the parameters characteristic of the material k11 and k22.

Additionally, the method of the invention also comprises a step in which through grooves are made in the bundle of fibres, said through grooves extending in a direction parallel to the bundle of fibres. This step improves the permeability of the tape made of fibres in the direction perpendicular to the plane, commonly defined by means of the parameter characteristic of the material k33, without jeopardising the mechanical properties of the tape.

Therefore, a method for treating fibres which allows obtaining a tape made of treated fibres having improved features with respect to other methods for treating dry fibres is thus obtained.

DETAILED DESCRIPTION OF THE INVENTION

Figure 1:
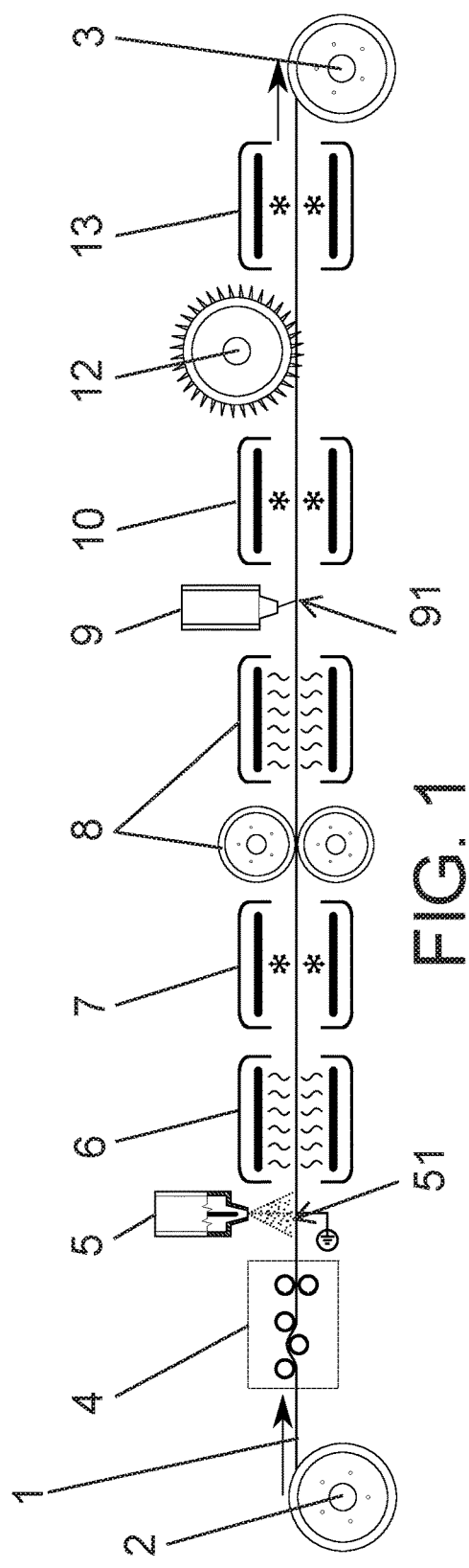
FIG. 1 shows a schematic view of a first exemplary embodiment of the installation for carrying out the method of the invention.

FIG. 1 shows an exemplary embodiment of an installation for carrying out the method for treating fibres of the invention, whereby there is obtained a tape made of dry fibres which is used in subsequent automatic tape laying processes such as, for example, ATL ("Automated Tape Laying") or AFP ("Automated Fiber Placement"), or manual tape laying.

Tapes made of dry fibres obtained by the method of the invention are formed from a reinforcement material and a binder of the fibres. It has been envisaged to use as reinforcement material carbon fibres, glass fibres, basalt fibres, natural fibres or any other material with a fibrillar configuration for the manufacture of composite materials, and it has been envisaged to use as a binder thermoplastic resins (co-polyamides, co-polyesters, phenoxy resin, epoxy resin, or polyurethanes), or thermosetting resins. Tapes made of fibres with a minimum resin load in relation to the fibre used are obtained in any case by the method of the invention.

Figure 2:
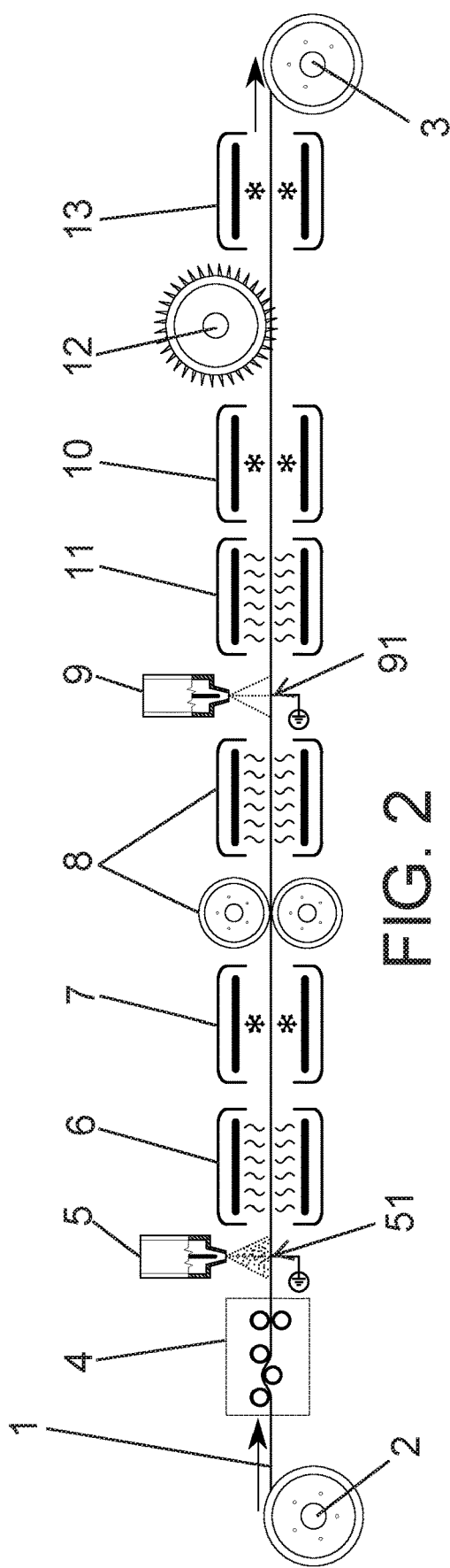
FIG. 2 shows a schematic view of a second exemplary embodiment of the installation for carrying out the method of the invention.

In the sense of the present invention, the units of the installation for treating fibres have been described according to the sense of direction of the bundle of fibres (1) depicted with arrows in FIGS. 1 and 2, according to the sense of left to right indicated in said figures.

The installation comprises means for continuously supplying a bundle of fibres (1) along the different stages of the treatment installation, the rate of supply of the bundle of fibres (1) preferably being between 1 m/min and 100 m/min, without this value being limiting, such that the fibre is kept taut throughout the entire treatment method, which prevents rippling from occurring.

Said means comprise an unwinder (2) and a rewinder (3) between which the bundle of fibres (1) is supplied, which allow guiding the bundle of fibres (1) so that the fibres are kept flat and without rippling, as well as regulating their tension and rate for the purpose of adapting to different fibre formats in addition to varying widths and grammages. The unwinder (2) can supply the fibres in "roving" format, or in "tow" format, i.e. in the format of a set of unidirectional fibre filaments, of for example a total width between 0.25 inches and 50 inches, without these values being limiting.

After the unwinder (2), in the sense of direction of the bundle of fibres (1), the installation optionally comprises an adjustment unit (4) for regulating the width of the bundle of fibres (1) and distributing the fibres such that optimal resin reception is achieved in subsequent stages of the installation.

Figure 3:
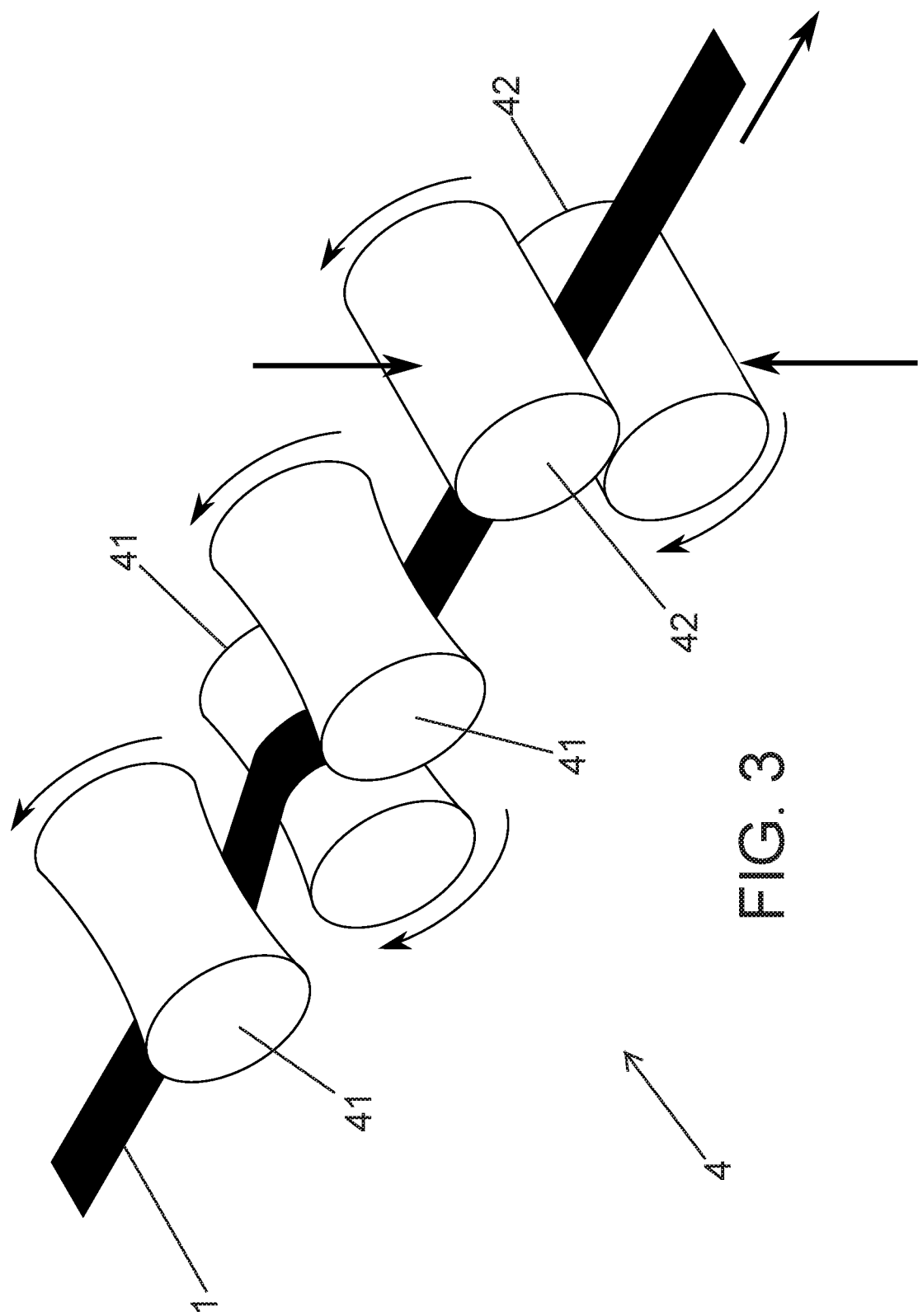
FIG. 3 shows a schematic perspective view of the adjustment unit which regulates the width of the bundle of fibres.

FIG. 3 shows a preferred embodiment of the adjustment unit (4), which comprises first rollers (41) configured for reducing the width of the bundle of fibres (1), and second rollers (42) configured for increasing the width of the bundle of fibres (1), such that by alternating the operation of the rollers (41, 42), the bundle of fibres (1) can be modified to adapt it to different widths and grammages.

The first set of rollers (41) comprises three rollers with a concave surface, such that the bundle of fibres (1) rubs against the concave surface of the rollers (41), reducing its width. At least one roller of the first rollers (41) is motor-driven, such that by controlling the rate of rotation of the at least one motor-driven roller, the reduction of the width of the bundle of fibres (1) can be controlled.

The second set of rollers (42) comprises two rollers with a cylindrical surface which are opposite and separated from one another, and between which the bundle of fibres (1) is passed, such that as the bundle of fibres (1) passes between the second rollers (42), friction is produced which reduces the thickness of the bundle of fibres (1) and therefore increases its width. Thus, by controlling the separation distance between the second rollers (42) and the rate of rotation of at least one of them, the increase in the width of the bundle of fibres (1) can be controlled.

After the adjustment unit (4), a first resin deposition unit (5) is arranged for applying particles of a first resin (51) on the bundle of fibres (1) by electrostatic deposition. The first resin deposition unit (5) has a spray nozzle which is configured for applying the first resin (51) in the form of powder with particles of a size preferably between 1 micron and 300 microns and an amount of first resin (51) less than 10% of the weight of the bundle of fibres, for the normal surface grammages. Specifically, given a section of the bundle of fibres (1), an amount of the first resin (51) which is less than 10% of the weight of said section of the bundle of fibres (1) is applied on said section of the bundle of fibres (1). The size of the particles and the amount of the first resin (51) applied allow optimal diffusion of the first resin (51) in the bundle of fibres (1) once the particles have been heated in a subsequent step of the method. Also, the percentage of resin used allows the final mechanical properties of the thus obtained tape made of fibres and the weight of the parts not to be affected.

The particles of the first resin (51) are given a negative electrical charge and are sprayed on an area of the bundle of fibres (1) which is grounded, such that said area of the bundle of fibres (1) is converted into an electrically neutral area which attracts the negatively charged particles of the first resin (51). Thus, when the particles come into contact with the bundle of fibres (1), they are retained in the area of the bundle of fibres (1) on which they are deposited.

The spray nozzle used allows regulating both the current and the voltage applied to the particles of the first resin (51), where said parameters can be adjusted and the effectiveness of the method optimised depending on the particle size, the distance from the spray nozzle to the bundle of fibres (1), as well as other factors which affect the method (such as, for example, air flow rates and pressures). Furthermore, by controlling the rate of the bundle of fibres (1) through the area of application of the first resin (51), the amount of first resin (51) which is deposited can be controlled, Accordingly the rate of resin waste is lower than in other conventional spray-type application techniques.

The sprayed particles of resin (51) not adhered can furthermore be recovered through commercial equipment for such use and be sieved to be introduced back into the process, achieving an effectiveness in deposition very close to 100%.

After the first resin deposition unit (5), there is arranged a heating unit (6), such as a microwave, a resistance oven or infrared lamps, for, in the event of using a thermoplastic resin, heating and melting the resin in a controlled manner, allowing it to diffuse in the bundle of fibres (1), or for, in the event of using a thermosetting resin, partially curing the resin. The heating unit (6) can be oriented towards one or both sides of the bundle of fibres (1), and it is also possible for the heating unit (6) to be oriented towards one side of the bundle of fibres (1) and on the opposite side of the bundle of fibres (1) a reflector is arranged for heating said opposite side of the bundle of fibres (1).

A cooling unit (7) can optionally be arranged immediately after the heating unit (6) to obtain a controlled cooling of the bundle of fibres (1) after the heating of the first resin (51).

Optionally, the installation can also have a heat and pressure application unit (8) after the heating unit (6) and cooling unit (7) arranged after the first resin deposition unit (5). The heat and pressure application unit (8) comprises pinch rollers followed by a heating unit which apply heat and pressure to the particles of the first resin (51) so that they can be diffused in the bundle of fibres (1). The use of a first thermoplastic resin allows it to be heated again and, together with the pressure of the pinch rollers, obtaining a deeper penetration of the first resin (51) and better cohesion of the bundle of fibres (1).

After the heat and pressure application unit (8), there is arranged a second resin deposition unit (9) configured for applying a partial and permeable surface coating to at least one side of the bundle of fibres (1) by depositing filaments of a second resin (91). The second resin (91) can be the same as or different from the first resin (51).

The application of a surface coating of the second resin (91) creates a porous coating on the bundle of fibres (1) which serves to generate a gap between tapes made of fibres when they are applied in subsequent tape laying processes for obtaining parts made of composite material, thereby improving the permeability of the composite material in the direction parallel to the plane of the fibres as it facilitates the flow of resin between tapes during the infusion or RTM process. The surface coating can be arranged on one of the sides of the bundle of fibres (1), or on both sides of the bundle of fibres (1).

According to the exemplary embodiment shown in FIG. 1, the application of the surface coating is obtained by means of a swirling process, depositing molten filaments of the second resin (91) in the form of a spiral or the like. To that end, a nozzle is used which applies the second resin (91) by means of small filaments of molten material, which are rotated to be deposited on the bundle of fibres (1) forming spirals, thereby generating a permeable layer on the bundle of fibres (1). The application of the second resin (91) is performed based on a variable flow rate, being adjusted in each case to the rate of the bundle of fibres (1) and the desired concentration of the second resin. Immediately after the second resin deposition unit (9), a cooling unit (10) is arranged for applying an air stream to the bundle of fibres (1) coated with resin, such as for example the application of an air stream with a "Vortex" type system, which is necessary for handling the tape made of fibres in subsequent processes, particularly when said processes require high speeds. Optionally, a heating unit can be arranged before the application of the swirling to improve the tack of the second resin (91) on the bundle of fibres (1), for which purpose the heating unit of the heat and pressure application unit (8) or another additional one can be used as a prior heating unit. (8)

According to another exemplary embodiment shown in FIG. 2, the application of the surface coating is obtained by means of a flocking process, depositing filaments of the second resin (91) by electrostatic deposition. Unlike the electrostatic deposition of the first resin (51), instead of particles having a smaller particle size distribution, filaments of resin of a thermoplastic material of a reduced dimension are deposited on the bundle of fibres (1). In this exemplary embodiment, it is necessary to arrange a heating unit (11) after the second resin deposition unit (9) to melt the filaments of the second resin (91) and bind them to the bundle of fibres (1), as well as to arrange a cooling unit (10) after the heating unit (11) for applying an air stream to the bundle of fibres (1) coated with resin, such as for example the application of an air stream with a "Vortex" type system, which, like in the swirling process, is necessary for handling the tape made of fibres in subsequent processes, and particularly for high speeds.

In the first exemplary embodiment of FIG. 1, behind the second resin deposition unit (9) and the cooling unit (10), or in the second exemplary embodiment of FIG. 2, behind the second resin deposition unit (9), the heating unit and the cooling unit (10), there is arranged a cutting unit (12) configured for making through grooves in the bundle of fibres (1), which extend in a direction parallel to the bundle of fibres (1).

Preferably, the cutting unit (12) has a rotating cutting roller with needles or cams arranged according to a staggered distribution to penetrate the bundle of fibres (1).

Even more preferably, the cutting unit (12) has several rotating cutting rollers with the needles or cams arranged according to the staggered distribution. The rollers of the cutting unit preferably work in a synchronised manner to improve making the cuts.

Optionally, the roller or rollers have heating means for working at the appropriate temperature. The needles or cams can also have heating means. In turn, the bundle of fibres (1) being treated can also have a cooling stage prior to grooving to achieve optimal results, which stage can be the cooling unit (10) itself or another cooling unit arranged immediately thereafter.

The cutting unit (12) allows generating grooves in the bundle of fibres (1) without damaging the fibres forming it, generating spaces in the direction parallel to the bundle which improve permeability of the finally obtained tape made of treated fibres in the direction perpendicular to the plane of the bundle of fibres (1) forming it, thus the grooves facilitate the diffusion of the resin therethrough in the subsequent process of manufacturing the final part from composite material, by means of infusion or RTM. The pressure at the outlet of this unit is kept controlled such that it allows a correct implementation of the grooving.

After the cutting unit (12), and before the rewinder (3), a final cooling unit (13) can optionally be arranged for cooling the bundle of fibres (1) and leaving it for the final storage thereof on reels which will subsequently be used in the tape laying processes.

Preferably, the first resin (51) is applied directly to the bundle of fibres (1) and the surface coating of the second resin (91) is applied to the bundle of fibres (1) with the first resin (51), as shown in FIGS. 1 and 2, since with this order of application the first resin (51) diffuses better in the bundle of fibres (1), binding it, and the second resin (91) allows improving the cohesion of the set of tapes made of treated fibres in the subsequent tape laying process. Nevertheless, it is possible for the surface coating of the second resin (91) to be applied directly to the bundle of fibres (1) and for the first resin (51) to subsequently be applied to the bundle of fibres (1) coated with the second resin (91).

Also, the grooves (121) are preferably made on the bundle of fibres (1) coated with the first (51) and second resins (91), as shown in FIGS. 1 and 2, although the grooves (121) can be made before applying the resins (51, 91), between the application thereof, or in the absence of both.

With that being the case, a tape made of treated and bonded fibres in the form of a treated dry fibre with an improved behaviour with respect to conventional dry fibres is obtained by means of the method of the invention, and which, as a result of the application by electrostatic deposition of the first resin (51) and the surface coating of the second resin (91), allows achieving a tape made of treated and bonded fibres with a minimum amount of resin with respect to the fibre used.

Figure 4:
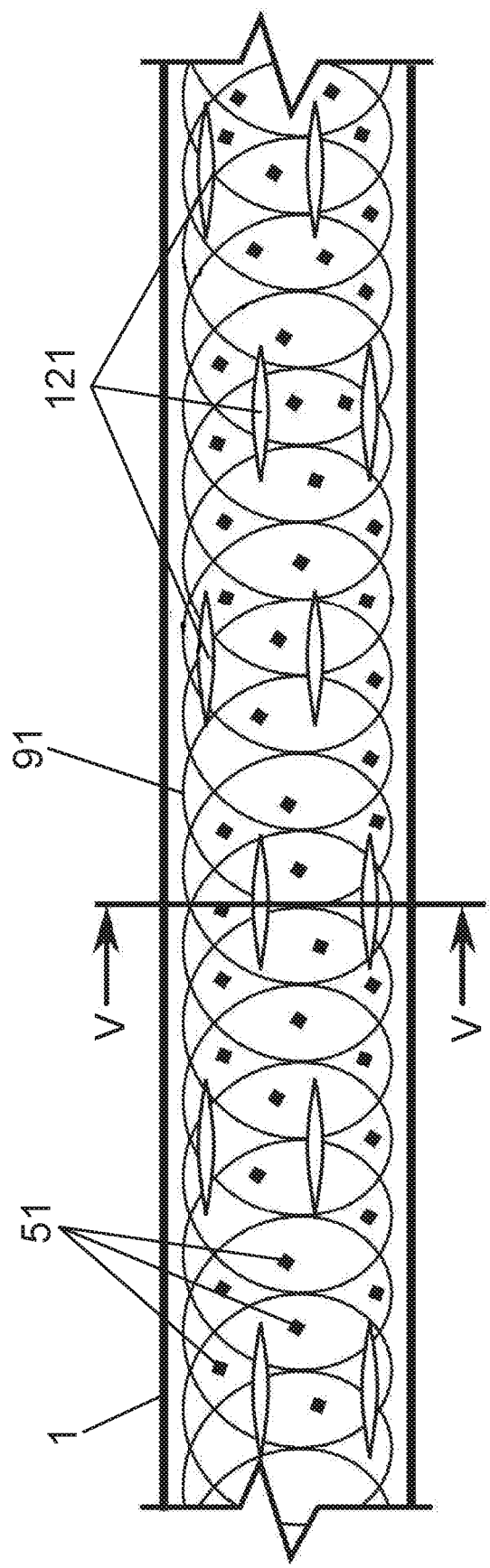
FIG. 4 shows a schematic depiction of the tape made of treated fibres resulting from the method of the invention.
Figure 5:
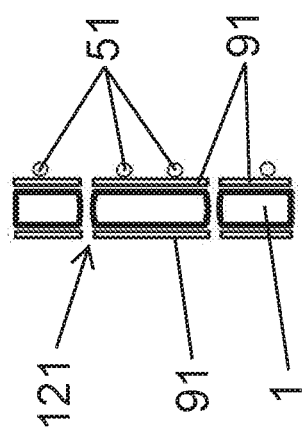
FIG. 5 shows a cross section of the tape made of treated fibres indicated with reference V-V in FIG. 4.

As can be seen in FIG. 4, the thus obtained tape made of fibres treated by the method of the invention comprises a bundle of fibres (1) which has been treated with particles of the first resin (51) and with a partial and permeable surface coating of the second resin (91), in which the particles of the first resin (51) are randomly but homogeneously deposited on the bundle of fibres (1) and have a particle size between 50 microns and 300 microns with a weight less than 10% of the weight of the bundle of fibres, and in which the surface coating of the second resin (91) has a thickness less than 0.2 mm.

Said particles of the first resin (51), once attached to the fibres forming the bundle of fibres (1), provide cohesion to the tape made of fibres as a whole, and also the capacity to adhere a tape made of treated fibres with other subsequent tape, by applying heat in the subsequent tape laying process by AFP, ATL or manual tape laying, thereby allowing the generation of integral multilayer tapes made of fibres.

As the particles of the second resin (91) adhere to the fibres forming the bundle of fibres (1), permeability between subsequent tapes made of treated fibres in the directions parallel to the plane of the fibres (1) is achieved, facilitating subsequent of infusion or injection processes aimed at forming the part made of composite material.

The thus obtained tape made of fibres treated by the method of the invention also has through grooves (121) in the direction parallel the bundle of fibres (1), which has dimensions between the 0.1 mm and 2 mm in equivalent diameter, which achieve correct permeability of the tape made of fibres in the direction perpendicular to the bundle of fibres (1), and which facilitate the infusion or injection processes needed to form the final part made of composite material, but without causing the fibres to break and with a very limited angular distortion. As can be seen in FIG. 4, the grooves (121) preferably are distributed in an aligned manner with respect to the longitudinal direction of the bundle of fibres according to a staggered distribution, which allows better structural integrity of the bundle of fibres (1).

The invention claimed is:

1. A method for treating fibres for obtaining a single tape of fibers comprising the steps of:
   continuously supplying a bundle of fibres along a travelling direction,
   applying a first resin to the bundle of fibres by electrostatic deposition of particles of the first resin,
   bonding the particles of the first resin to the bundle of fibres by heating, and
   applying a surface coating to at least one side of the bundle of fibres by depositing filaments of a second resin,
   wherein in the single tape of fibers a cutting unit generates grooves in the bundle of fibres without damaging the fibres forming the grooves in a direction parallel to the bundle of fibres along the travelling direction, thereby obtaining the single tape made of treated fibers.

2. The method for treating fibres, according to claim 1, wherein the first resin is applied directly to the bundle of fibres and the surface coating of the second resin is applied to the bundle of fibres with the first resin.

3. The method for treating fibres, according to claim 1, wherein the surface coating of the second resin is applied directly to the bundle of fibres and the first resin is applied to the bundle of fibres with the surface coating of the second resin.

4. The method for treating fibres, according to claim 1, wherein an amount of the first resin less than 10% of the weight of the bundle of fibres is applied.

5. The method for treating fibres, according to claim 1, wherein the particles of the first resin have a size between 1 micron and 300 microns.

6. The method for treating fibres, according to claim 1, wherein the surface coating of the second resin has a thickness less than 0.2 mm.

7. The method for treating fibres, according to claim 1, wherein the bundle of fibres is supplied at a rate between 1 m/min and 100 m/min.

8. The method for treating fibres, according to claim 1, further comprising a step prior to the application of the first resin and second resin, in which the width of the bundle of fibres is adjusted.

9. The method for treating fibres, according to claim 8, wherein the adjustment of the width of the bundle of fibres comprises a first sub-step in which the bundle of fibres is passed through first rollers with a concave surface which reduce the width of the bundle of fibres, and a second sub-step in which the bundle of fibres is passed through second rollers with a cylindrical surface which are opposite and separated from one another so as to increase and adjust the width of the bundle of fibres.

10. The method for treating fibres, according to claim 1, further comprising a step in which heat and pressure are applied to the particles of the first resin so that they can be diffused in the bundle of fibres.

11. The method for treating fibres, according to claim 1, wherein the surface coating is obtained by depositing molten filaments of the second resin in the form of a spiral on at least one side of the bundle of fibres and subsequently by applying an air stream to the coated bundle of fibres or an equivalent cooling system.

12. The method for treating fibres, according to claim 1, wherein the surface coating is obtained by depositing filaments of the second resin by electrostatic deposition on at least one side of the bundle of fibres, and subsequently by applying heat to the filaments to melt the second resin and for bonding the bundle of fibres and applying an air stream to the coated bundle of fibres or an equivalent cooling system.

13. The method for treating fibres, according to claim 12, wherein the grooves are made using rollers comprising needles or cams arranged in a staggered manner.

14. A method for laying multiple tapes comprising carrying out the method for treating fibres for obtaining a single tape of fibers according to claim 1 and laying the single tape of fibers layer by layer to obtain the layer of multiple tapes.

* * * * *